United States Patent
Gaessler et al.

(10) Patent No.: US 7,124,717 B2
(45) Date of Patent: Oct. 24, 2006

(54) METHOD AND DEVICE FOR OPERATING AN INTERNAL COMBUSTION ENGINE

(75) Inventors: Hermann Gaessler, Vaihingen (DE); Udo Diehl, Stuttgart (DE); Karsten Mischker, Leonberg (DE); Rainer Walter, Pleidelsheim (DE); Andreas Blumenstock, Ludwigsburg (DE); Bernd Rosenau, Tamm (DE); Juergen Schiemann, Markgroeningen (DE); Christian Grosse, Kornwestheim (DE); Georg Mallebrein, Korntal-Muenchingen (DE); Volker Beuche, Stuttgart (DE); Stefan Reimer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/451,774

(22) PCT Filed: Dec. 4, 2001

(86) PCT No.: PCT/DE01/04536

§ 371 (c)(1),
(2), (4) Date: Apr. 30, 2004

(87) PCT Pub. No.: WO02/50406

PCT Pub. Date: Jun. 27, 2002

(65) Prior Publication Data

US 2004/0173170 A1 Sep. 9, 2004

(30) Foreign Application Priority Data

Dec. 21, 2000 (DE) ................. 100 63 750

(51) Int. Cl.
*F02B 75/02* (2006.01)
(52) U.S. Cl. .................. 123/64; 123/198 F; 123/90.15
(58) Field of Classification Search .................. 123/64, 123/198 F, 90.15, 90.16
See application file for complete search history.

(56) References Cited

U.S. PATENT DOCUMENTS

| 4,075,837 A | | 2/1978 | Hanoaka |
| 4,367,700 A | * | 1/1983 | Pace ............................ 123/64 |
| 4,641,613 A | | 2/1987 | Delesalle |
| 4,924,823 A | * | 5/1990 | Ogura et al. .................. 123/64 |
| 5,377,631 A | | 1/1995 | Schechter |
| 6,286,466 B1 | * | 9/2001 | Braun et al. .................. 123/21 |
| 6,789,513 B1 | * | 9/2004 | Ziabazmi ..................... 123/64 |

FOREIGN PATENT DOCUMENTS

| EP | 0 367 448 | 5/1990 |
| EP | 0 443 785 | 8/1991 |

* cited by examiner

*Primary Examiner*—Marguerite McMahon
(74) *Attorney, Agent, or Firm*—Kenyon & Kenyon LLP (57) ABSTRACT

A method and a device for operating an internal combustion engine having a plurality of cylinders are described, each cylinder having at least one intake valve and one exhaust valve having fully variable valve control, a fuel feed to at least one first cylinder of the plurality of cylinders being deactivated, a first quantity of fresh air being drawn in by opening the at least one intake valve of the at least one first cylinder in a first downward movement of the piston of the at least one first cylinder, and a second quantity of fresh air being ejected by opening the at least one exhaust valve with a first upward movement of the piston of the at least one first cylinder.

11 Claims, 3 Drawing Sheets

| Takt 1 | Takt 2 | Takt 3 | Takt 4 | Takt 5 | Takt 6 |
|---|---|---|---|---|---|
| Ansaugen   Einlaß auf   Auslaß zu | Kompression   Einlaß zu   Auslaß zu | Verbrennung   Einlaß zu   Auslaß zu | Ausschieben   Einlaß zu   Auslaß auf | Einlaß zu   Auslaß zu | Einlaß zu   Auslaß zu |

Fig. 3

| Takt 1 | Takt 2 | Takt 3 | Takt 4 | Takt 5 | Takt 6 |
|---|---|---|---|---|---|
| Ansaugen   Einlaß auf   Auslaß zu | Kompression   Einlaß zu   Auslaß zu | Verbrennung   Einlaß zu   Auslaß zu | Ausschieben   Einlaß zu   Auslaß auf | Einlaß auf   Auslaß zu | Einlaß zu   Auslaß auf |

Fig. 4

METHOD AND DEVICE FOR OPERATING AN INTERNAL COMBUSTION ENGINE

FIELD OF THE INVENTION

The present invention relates to a method and a device for operating an internal combustion engine including a plurality of cylinders, each including at least one intake valve and one exhaust valve having fully variable valve control.

BACKGROUND INFORMATION

Modern internal combustion engines having fully variable valve drive may operate with electromagnetic valve control (EMVC), electrohydraulic valve control (EHVC) or with mechanical options such as a variable camshaft control (VACSC) for phase control in conjunction with a variable valve drive (VVD) for lift control. In electromechanical and electrohydraulic valve control, the engine does not include a camshaft, although a camshaft is may be present in the mechanical variants.

Because there is no camshaft, electromagnetic and electrohydraulic valve controls offer more degrees of freedom in controlling the opening, the closing and the lift of the intake and exhaust valves of an engine, e.g., a spark-ignition engine or a diesel engine. Using electromagnetic valve control, the opening angle and the closing angle of a valve may be controlled, and with electrohydraulic valve control, the opening angle and the closing angle, the opening speed and closing speed, as well as the lift of the corresponding valve may be controlled.

The possibility of individually controlling the intake valves and exhaust valves of each cylinder of the engine may allow improved engine operation.

U.S. Pat. No. 5,377,631 describes an internal combustion engine which is operated in a 6-, 8- or 12-stroke operation instead of the conventional 4-stroke operation. In this case, one or more cylinders are deactivated during engine operation in indirect proportion to the engine load. Fuel injection is suppressed in the deactivated cylinders and the intake and exhaust valves are closed with the downward and upward movement of the piston in the cylinder. Thus, the downward movement of the piston just creates a vacuum when the cylinder is deactivated, and the upward movement of the piston returns the internal pressure in the cylinder back to atmospheric pressure. This may allow unthrottled operation of the engine with less friction in deactivated cylinders, thus making available an engine having lower fuel consumption.

To reduce hydrocarbon emissions (HC emissions) immediately after starting a spark-ignition engine, it is conventional today to inject fresh air directly downstream from the exhaust valves of the engine by using an electric pump. Such a pump is referred to as a secondary air pump and may include secondary air valves, secondary air tubing and electric triggering. Fresh air induces oxidation of the hydrocarbons (HC) in the exhaust gas while the latter is still hot. This is referred to as secondary oxidation.

In the secondary oxidation described above, the spark-ignition engine may also be operated at a $\lambda<1$. This secondary oxidation of a fuel-air mixture creates an exothermic reaction, thus the catalytic converter may be arranged in an exhaust system of the spark-ignition engine to be rapidly heated up.

U.S. Pat. No. 4,075,837 describes an internal combustion engine in which a second intake duct, which is separate from a main intake duct and is connected to a single cylinder, is provided so that secondary air may be supplied downstream from the exhaust valves. An exhaust duct of this single cylinder includes connections to a main exhaust duct of the remaining cylinders, opening into the exhaust ducts directly downstream from the exhaust valves of the remaining cylinders. Therefore, secondary air is supplied in operating states in which the exhaust is purified further by supplying secondary air, i.e., by suppressing a fuel supply and an ignition operation in this one cylinder including the separate intake duct. Thus, the piston acts like a pump in this cylinder in which the fuel supply and ignition have been suppressed, drawing air in through the intake valve with a downward movement of the piston and, with the upward movement of the piston, when the intake valve is closed, pumping, through the exhaust duct of this cylinder, the fresh air in the cylinder as secondary air to the remaining cylinders.

According to U.S. Pat. No. 4,075,837, however, it is necessary to provide another intake duct, which is separate from the main intake duct, as well as another exhaust duct for the cylinder which is used as an air pump. This increases the cost and the required maintenance of the engine.

SUMMARY

The present invention may provide a method and a device for reducing exhaust gas emissions from an internal combustion engine.

The method according to the present invention is for operating an internal combustion engine including a plurality of cylinders, each including at least one intake valve and one exhaust valve having fully variable valve control. In this engine, the fuel supply is deactivated, i.e., suppressed, in at least one first cylinder. A first quantity of fresh air is drawn into this at least one first cylinder by opening the at least one intake valve with a downward movement of the piston of the at least one first cylinder in which the fuel supply is deactivated. The fresh air in the cylinder is ejected into an exhaust gas duct of the engine by opening the at least one exhaust valve of this at least one first cylinder in the following upward movement of the piston.

The present invention may allow omission of a secondary electric air pump, secondary air valves and the associated tubing and electric triggering. Furthermore, the present invention may provide an arrangement for reducing exhaust emissions by supplying secondary air without having to provide another intake duct or exhaust duct.

The present invention may be embodied so that the intake and exhaust valves of the plurality of cylinders are triggered so that the internal combustion engine is operated in 6-stroke or multistroke operation.

This example embodiment of the present invention may allow operation of the internal combustion engine so that it is optimized according to use.

The present invention may also be embodied so that the at least one intake valve and the at least one exhaust valve of the at least one first cylinder are closed, at least at the time of a second downward movement and of a second upward movement immediately after an exhaust stroke of the at least one first cylinder of the plurality of cylinders.

This additional example embodiment of the present invention may allow a further reduction in fuel consumption due to the fact that the vacuum generated in the cylinder with the downward movement of the piston may allow unthrottled operation of this cylinder with reduced friction. This may allow flexible adaptation of the engine to alternating loads and cold start situations, for example, with improvements in both HC emissions and fuel consumption.

The present invention may be further embodied such that the first quantity of fresh air is controlled by controlling at least one of a plurality of valve opening parameters of the at least one exhaust valve of the at least one first cylinder of the plurality of cylinders in the first downward movement of the piston, and the quantity of the first triggered quantity of fresh air that is ejected as the second quantity of fresh air is controlled by controlling at least one of a plurality of valve opening parameters of the at least one exhaust valve of the at least one first cylinder in the first downward movement of the piston.

This example embodiment may allow very rapid adaptation of the quantity of secondary air, i.e., the second quantity of fresh air, which is ejected from the at least one exhaust valve. Furthermore, this example embodiment may allow intake of a small quantity of fresh air, creating a low vacuum in the cylinder to reduce friction, and it may allow ejection of this fresh air through the at least one exhaust valve. Therefore, by combining vacuum generation and secondary air feed, may allow operation with reduced HC emissions and good fuel economy.

The present invention may be embodied in such a manner that the second quantity of fresh air is regulated by controlling at least one of the plurality of valve opening parameters of the at least one intake valve and the at least one exhaust valve on the basis of an output signal of a lambda probe.

This example embodiment may allow a closed-loop regulation of secondary air.

DETAILED DESCRIPTION

An example embodiment of the present invention is described below on the basis of the example of a four-cylinder spark-ignition engine having a fully variable valve drive with reference to FIGS. 1 through 5. However, the present invention is not limited to this example, but instead it may be applied in the same manner to any internal combustion engine including a plurality of cylinders with a fully variable valve drive, regardless of the fuel used.

Figure 1:
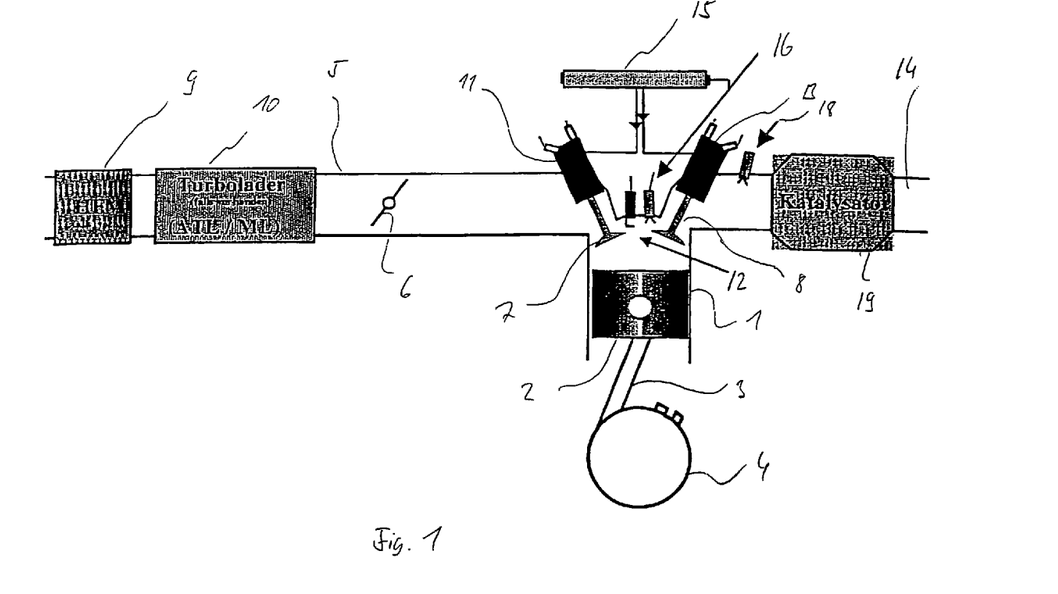
FIG. 1 illustrates a basic configuration of a cylinder of an internal combustion engine having fully variable valve control.

FIG. 1 illustrates the basic configuration of a cylinder of a spark-ignition engine having fully variable valve control.

In cylinder 1, a piston 2 is upwardly movable in an upward movement and downwardly movable in a downward movement. Piston 2 is connected by a connecting rod 3 to a crankshaft 4 which converts the upward and downward movements of piston 2 into a rotational movement.

FIG. 1 also illustrates an intake duct 5. A throttle valve 6 is arranged in intake duct 5. By suitable triggering of an intake valve 7 and an exhaust valve 8, a spark-ignition engine may be implemented without throttle valve 6.

Furthermore a hot-film air flow sensor 9 is also provided in intake duct 5 for measuring the air flow through intake duct 5; there is also a turbocharger 10, although it is optional.

Intake valve 7 is actuated by a valve actuator 11 so that intake valve 7 connects a combustion chamber 12 of the cylinder to intake duct 5 when open, and when closed, it separates intake duct 5 from combustion chamber 12. The lift of intake valve 7 may be varied via valve actuator 11.

Exhaust valve 8 is actuated by an exhaust valve actuator 13 so that, when open, it connects combustion chamber 12 of cylinder 1 to an exhaust duct 14, and when closed, it separates combustion chamber 12 from exhaust duct 14. The lift of exhaust valve 8 may be varied via exhaust valve actuator 13.

Intake valve actuator 11 and exhaust valve actuator 13 are connected to a pressure supply device 15 such as a common rail.

Furthermore, an injector 16 for injecting a fuel to be burned in combustion chamber 12 is also provided in combustion chamber 12 of cylinder 1. In addition to injector 16, a spark plug 17 is also provided for igniting the fuel-air mixture.

A lambda probe 18 is provided in exhaust duct 14. Furthermore, a catalytic converter 19 is provided in exhaust duct 14, where it is arranged downstream from lambda probe 18.

The functioning of intake valve actuator 11 and exhaust valve actuator 13 is described below with reference to FIG. 2.

Figure 2:
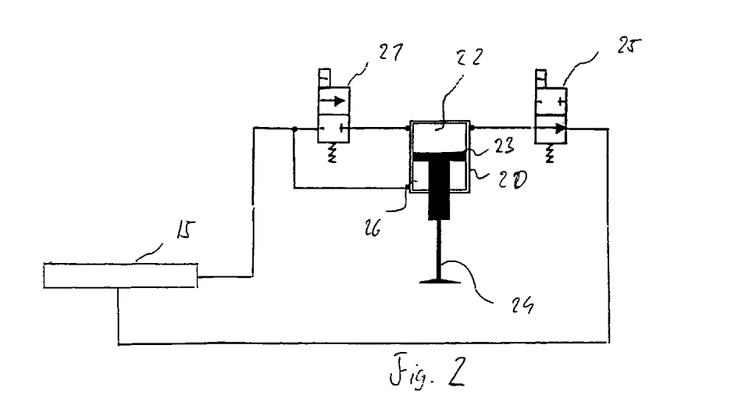
FIG. 2 illustrates a valve actuator of the fully variable valve control of the internal combustion engine from FIG. 1.

FIG. 2 illustrates a valve actuator 20. Valve actuator 20 has the same configuration as intake valve actuator 11 illustrated in FIG. 1 or exhaust valve actuator 13 illustrated in FIG. 1.

A first solenoid valve 21 is connected to pressure supply device 15. Pressure supply device 15 supplies hydraulic fluid under pressure. First solenoid valve 21 switches a connection between pressure supply device 15 and a first chamber 22 of valve actuator 20. When solenoid valve 21 is in a closed position, a hydraulic fluid connection between pressure supply device 15 and first chamber 22 is interrupted. If solenoid valve 21 is in an open position, hydraulic fluid under pressure is able to flow from pressure supply device 15 through solenoid valve 21 into first chamber 22 of valve actuator 20. Hydraulic fluid flowing into first chamber 22 fills first chamber 22 and displaces a valve foot 23 of a valve 24 in valve actuator 20. By varying the hydraulic pressure of pressure supply device 15, an opening speed of valve 24 and a closing speed of valve 24 are varied.

Valve 24 is thus opened. When the desired valve lift has been achieved, first solenoid valve 21 is closed. Then valve foot 23 and thus valve 24, which is rigidly connected to valve foot 23, remain in the position reached with the valve lift thereby achieved.

To close valve 24, a second solenoid valve 25 is opened; in an open position, this second solenoid valve connects first chamber 22 to the low-pressure side of pressure supply device 15, and in a closed position it interrupts this connection. Hydraulic fluid in first chamber 22 is thus able to flow back into pressure supply device 15.

A second chamber 26 of valve actuator 20 is also illustrated. Second chamber 26 is connected to pressure supply device 15.

Thus the pressure supplied by pressure supply device 15 is applied to second chamber 26 of valve actuator 20. When second solenoid valve 25 is opened, hydraulic fluid flowing under pressure from pressure supply device 15 into second chamber 26 displaces valve foot 23 together with valve 26 because the hydraulic fluid in first valve chamber 22 is able to flow out through second solenoid valve 25. Valve 24 is thus closed.

Figure 3:
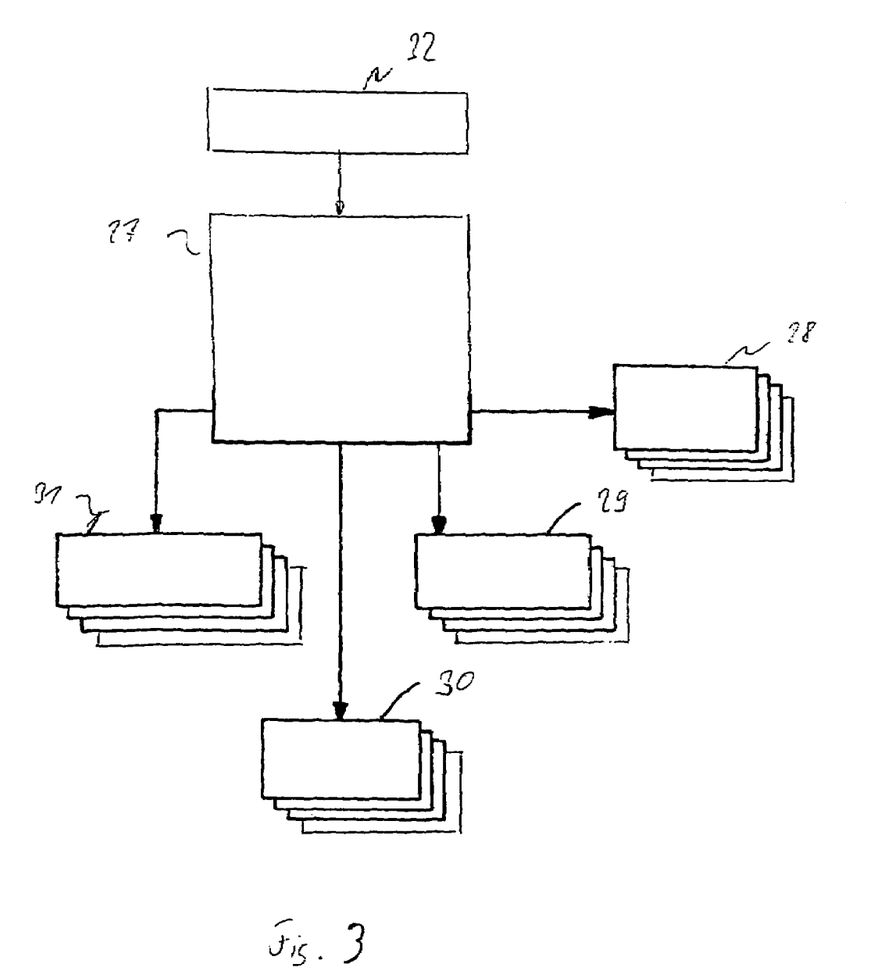
FIG. 3 illustrates an example embodiment of the device according to the present invention for implementing an example embodiment of the method according to the present invention.

FIG. 3 illustrates an example embodiment of the control device according to the present invention for executing an example embodiment of the method according to the present invention.

FIG. 3 illustrates an example embodiment of control device 27 according to the present invention. Control device 27 is connected to a plurality of spark plugs 28, namely in the present example four spark plugs for four cylinders. By suitable triggering of spark plugs 28, control device 27 is able to suppress ignition of selected cylinders, but ignition does occur in the remaining cylinders. This means that control device 27 is able to suppress ignition in the first cylinder of the spark-ignition engine, for example, but ignition does occur in the remaining three cylinders of the spark-ignition engine.

Control device 27 is also connected to a plurality of intake valve actuators 29, namely in the present example four intake valve actuators 29, one intake valve being connected for each cylinder. Although in the present case only one intake valve together with one intake valve actuator 29 is provided for each cylinder, a plurality of intake valves may be provided for each cylinder of the spark-ignition engine.

Control device 27 is also connected to a plurality of exhaust valve actuators 30, namely in the present case four exhaust valve actuators 30. Although in the present case only one exhaust valve together with an exhaust valve actuator 30 is provided for each cylinder, a plurality of exhaust valves may be provided together with a plurality of exhaust valve actuators 30 for each cylinder. Intake valve actuator 29 and exhaust valve actuator 30 correspond to the valve actuator of FIG. 2.

Output signals of control device 27 to the plurality of intake valve actuators 29 and exhaust valve actuators 30 are signals which pertain to the switching operations of solenoid valves 21 and 25 in the intake valve actuators 29 and exhaust valve actuators 30. By using control device 27 the opening times of the intake valve and/or exhaust valves, the closing times of the intake and/or exhaust valves, the opening lift of the intake and/or exhaust valves and the opening and/or closing speed of the intake and/or exhaust valves may be varied by suitable triggering of first solenoid valve 21 and second solenoid valve 25 in the plurality of intake valve actuators 29 and the plurality of exhaust valve actuators 30.

Control device 27 is also connected to a plurality of fuel injection devices 31, namely in the present case four fuel injection nozzles. By triggering fuel injection devices 31, control device 27 is able to activate or deactivate fuel injection for selected cylinders. This means that control device 27 is capable of deactivating fuel injection in a first cylinder, for example, through suitable triggering of fuel injection devices 31, whereas the fuel injection in the remaining three cylinders of the spark-ignition engine is activated, i.e., fuel injection occurs in each.

Control device 27 is also connected to a lambda probe 32 which is arranged in exhaust duct 14 of the spark-ignition engine and delivers an output signal to control device 27 which indicates the composition of exhaust gases of the spark-ignition engine or of an individual cylinder of the spark-ignition engine.

Control device 27 may be configured as a microprocessor device. However, control device 27 may be configured as a state machine or an EPLD.

An example embodiment of functioning of control device 27 in FIG. 3 will now be described with reference to FIGS. 5 and 6.

The firing sequence of the four-cylinder spark-ignition engine in the present example is 1-3-S-2-4-S, where "S" indicates that no combustion occurs in the cylinder, and instead the fuel injection and may be the ignition are deactivated in that cylinder.

Figure 4:
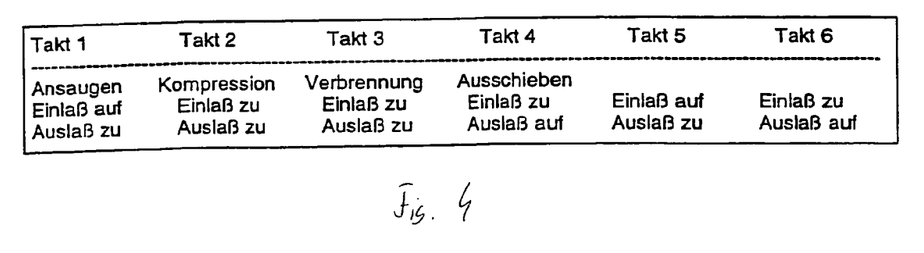
FIG. 4 illustrates an example embodiment of operation according to the present invention of the internal combustion engine from FIG. 1.

FIG. 4 illustrates a table illustrating the cycles of a cylinder. Stroke 1 in FIG. 4 is the intake stroke of the cylinder. During the intake stroke, the piston is moved in the cylinder, so that the size of the combustion chamber is increased. This is referred to below as a downward movement of the piston. Control device 27 here triggers intake valve actuator 29 of the intake valve so that the intake valve is opened during the downward movement of the piston. Due to the downward movement of the piston, fresh air is drawn out of the intake duct of the cylinder and into the combustion chamber of the cylinder. Control device 27 triggers fuel injection device 31 of this cylinder during the intake stroke, so that during the downward stroke of the piston, fuel is injected into the combustion chamber of the cylinder. Therefore, a mixture of fuel and fresh air is formed in the combustion chamber of the cylinder. During the intake stroke, control device 27 triggers exhaust valve actuator 30 of the exhaust valve so that the exhaust valve is closed.

Stroke 2 of the cylinder is the compression stroke of the cylinder. During the compression stroke of the cylinder, the piston is displaced in the cylinder so that the volume of the combustion chamber is reduced. This is referred to below as an upward movement of the cylinder. Control device 27 triggers intake valve actuator 29 and exhaust valve actuator 30 of the intake valve and the exhaust valve so that both valves are closed. Therefore, the fuel-fresh air mixture in the combustion chamber of the cylinder is compressed in the upward movement of the piston.

In stroke 3 of the cylinder, the piston is displaced in the cylinder so that the volume of the combustion chamber of the cylinder is increased. This is referred to below as a downward movement of the piston. In stroke 3, the combustion stroke of the cylinder, control device 27 triggers spark plug 28 of the cylinder so that a predetermined crank angle amount before or after top dead center of the cylinder spark plug 28 delivers an ignition spark and ignites the mixture of fuel and fresh air in the combustion chamber. Control device 27 triggers intake valve actuator 29 and exhaust valve actuator 30 during the combustion stroke, so that both the intake valve and the exhaust valve are closed.

In stroke 4 of the cylinder, the piston is displaced in the cylinder, so that the volume of the combustion chamber is reduced. This is referred to below as an upward movement of the piston. Stroke 4 of the cylinder is referred to as the exhaust stroke, during which control device 27 triggers intake valve actuator 29 of the intake valve so that the intake valve is closed during the entire exhaust stroke, whereas control device 27 triggers exhaust valve actuator 30 so that the exhaust valve is opened and residual gas from the combustion is ejected into the exhaust duct of the cylinder by the upward movement of the cylinder.

According to the present invention, there follow two additional strokes, namely a stroke 5 and a stroke 6. During stroke 5, the piston is displaced downward in the cylinder, i.e., the volume of the combustion chamber of the cylinder increases from the end of the fourth stroke at top dead center of the cylinder to the end of stroke 5 at bottom dead center of the cylinder. During stroke 6 from bottom dead center of the cylinder to top dead center of the cylinder, the volume of the combustion chamber of the cylinder decreases again with the upward movement of the cylinder.

In contrast with normal operation of a 4-stroke spark-ignition engine in which the cycle would continue after the fourth stroke with stroke 1, i.e., the intake stroke with fuel injection, there is no fuel injection in stroke 5 following stroke 4 according to the present invention. Instead, control device 27 triggers fuel injection device 31 of the cylinder so that the fuel injection is deactivated during stroke 5.

Control device 27 triggers intake valve actuator 29 of the intake valve so that the intake valve is at least temporarily opened during stroke 5. Furthermore, control device 27 triggers exhaust valve actuator 30 of the exhaust valve so that the exhaust valve is closed in stroke 5.

In stroke 6 which follows, control device 27 triggers intake valve actuator 29 so that the intake valve is closed and it triggers exhaust valve actuator 30 so that the exhaust valve is opened during the upward movement of the piston.

Thus, in stroke 5 of the spark-ignition engine, fresh air is drawn into the combustion chamber of the cylinder and is then ejected into the exhaust duct during stroke 6 which follows. Secondary air then promotes oxidation of the exhaust in the exhaust duct.

By varying the triggering of intake valve actuator 29, control device 27 is able to control the amount of fresh air drawn into the combustion chamber of the cylinder in stroke 5. By suitable triggering of first solenoid valve 21 and second solenoid valve 25 in FIG. 2, control device 27 is able to vary a valve opening time of the intake valve, a valve closing time and a valve lift.

Furthermore, control device 27 triggers a valve opening time of the exhaust valve, a valve closing time of the exhaust valve and a valve lift through suitable triggering of first solenoid valve 21 and second solenoid valve 25 of exhaust valve actuator 30.

The fresh air filling of the cylinder is controlled mainly by an angle intake closing (ES) control variable and by the lift of the intake valve. If the lift of the intake valve is great enough so that there is no mentionable pressure difference, i.e., no difference in pressure between the cylinder combustion chamber and an intake duct of the cylinder, then the angle intake closing variable is the control variable with which the fresh air filling control is implemented. For example, with an early angle intake closing, i.e., closing of the intake valve before the piston reaches bottom dead center, a fresh air filling of the cylinder may be limited. Furthermore, the fresh air filling into the combustion chamber of the cylinder may be restricted with a late closing of the intake valve, i.e., a late angle intake closing, to limit the fresh air filling into the combustion chamber of the cylinder because the fresh air filling that has already flowed into the combustion chamber is partially displaced back into the intake duct.

The second main control variable for the fresh air filling of the cylinder is the lift control variable, i.e., the lift of the intake valve.

The lift determines an intake and/or exhaust cross section of the valve and thus the differential pressure across the valve. Above a certain rpm-dependent valve lift, which depends on the configuration of the intake manifold and the valve, i.e., the valve seat, an approximate equalization of pressure is achieved. This means that the pressure difference becomes almost zero very quickly after the valve opens.

Accordingly, with a large lift, the opening and closing operations of the valve are separated. This means that early or late opening of the exhaust valve, i.e., an early or late angle exhaust opening variable, has very little influence on the remaining amount of residual gas. In contrast with that, the opening and closing operations are strongly linked when the lift is small. This means that an opening time area, which is defined as the opening time in crank angle units multiplied by the opening lift, is the deciding factor for the load change and thus the fresh air filling.

The required lift of the intake valve and/or exhaust valve depends on engine rpm. A high rpm requires a large lift to allow an equalization of pressure. At a low rpm, a lower lift is sufficient. However, if the lift is too small it results in loss of flow at a gap between the valve seat and the valve.

A quantity of residual gas from combustion in the combustion chamber of the cylinder in stroke 5 is determined by an angle intake opening variable, i.e., the opening time of the intake valve, together with an angle exhaust closing, i.e., the closing time of the exhaust valve. The angle intake opening control variable and the angle exhaust closing control variable influence the fresh air filling of the combustion chamber of the cylinder to the extent that they control the residual gas of a prior combustion in the following intake procedure in stroke 5. If in the following intake procedure there is a large amount of residual gas in the combustion chamber of the cylinder, only a small amount of fresh gas may be supplied. If there is a small amount of residual gas in the combustion chamber of the cylinder in the following intake procedure, a larger amount of fresh gas may be supplied.

The same fresh air filling may be achieved by either reducing the intake stroke of the intake valve or, at a large intake valve stroke, advancing or retarding the angle intake closing control variable.

Control device 27 determines the amount of secondary air ejected into the exhaust duct on the basis of an output signal of lambda probe 32. Control device 27 may be configured so that the connection to lambda probe 32 is a feedback connection so that the second quantity of fresh air, which is ejected into the exhaust duct and is controlled by suitable triggering of intake valve actuator 29 and exhaust valve actuator 30 is determined by lambda probe 32, which in turn delivers a feedback signal to control device 27, resulting in a closed-loop regulating circuit.

Control device 27 may also be configured so that the HC concentration is used as the feedback signal.

The second quantity of air ejected in stroke 6 is then the secondary air, which contributes toward oxidation of the exhaust gas. As described above, the first quantity of fresh air drawn in during stroke 5 as well as the second quantity of fresh air ejected in stroke 6 may be controlled by varying the valve opening parameters, so the secondary air may be controlled or regulated precisely. It is thus possible to accurately control secondary oxidation and thus accurately control HC emissions by the spark-ignition engine.

The exhaust valve in stroke 6 may be closed at an earlier point in time and thus not eject all of the first fresh air filling in the cylinder, as the second fresh air filling, into the exhaust duct. Control of the secondary air may thus be executed very rapidly because until the end of the exhaust operation in stroke 6, the quantity of fresh air ejected may be limited by closing the exhaust valve at an earlier point in time.

When a spark-ignition engine is operated with a 1-3-S-2-4-S firing sequence, each cylinder of the spark-ignition engine alternately ejects burned exhaust gas and secondary air into the exhaust duct. It is thus possible to bring secondary air directly into the vicinity of the exhaust valve so that both the exhaust gas ejected before, and the exhaust gas ejected thereafter are able to oxidize.

Figure 5:
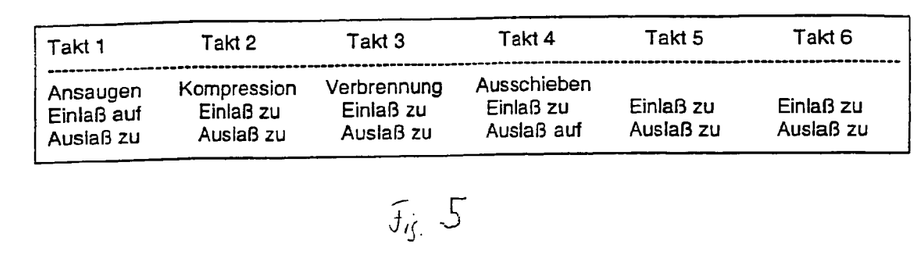
FIG. 5 illustrates an example embodiment of operation according to the present invention of the internal combustion engine from FIG. 1.

When control device 27 detects on the basis of engine performance variables (e.g., an engine temperature, an exhaust gas or catalytic converter temperature model or an output signal of lambda probe 32) that no secondary air is required, control device 27 controls intake valve actuator 29 and exhaust valve actuator 30 of the exhaust valve and of the intake valve of the cylinder so that both valves are closed during stroke 5 and stroke 6. This operation is illustrated in FIG. 5. Strokes 1 through 4 correspond to strokes 1 through 4 described with reference to FIG. 4.

This operation may allow fuel-saving operation of the spark-ignition engine because, during the downward movement of the piston and the cylinder in stroke 5 with the valves closed, a vacuum is generated, thereby reducing the friction of the pistons in the cylinders. Reduced friction results in reduced fuel consumption by the spark-ignition engine.

Control device 27 controls the operation of the spark-ignition engine through the selection of the operation of the spark-ignition engine illustrated in FIG. 4 or the operation of the spark-ignition engine illustrated in FIG. 5 as a function of, for example, the output signal of lambda probe 32, so that both the HC emissions by the spark-ignition engine and the fuel consumption by the spark-ignition engine are minimized.

Control device 27 is able to create mixed operation, combining the operation of FIG. 4 and the operation of FIG. 5 through suitable triggering of intake valve actuator 29 and exhaust valve actuator 30. Control device 27 controls the first quantity of fresh air, which is drawn in during stroke 5, so that the first quantity of fresh air is smaller than a quantity of air that may be contained in the maximum volume of the combustion chamber of the cylinder at the prevailing intake manifold pressure. In other words, control device 27 controls intake valve actuator 29 in such a manner that the intake valve is closed before the piston is at bottom dead center. This reduces charge cycle losses. Then in stroke 6 which follows, the first quantity of fresh air or a portion of thereof is ejected into the exhaust duct.

Furthermore, control device 27 is capable of decelerating a spark-ignition engine through suitable triggering of intake valve actuator 29 and exhaust valve actuator 30 by first inhibiting the downward movement of the piston in the cylinder by closing the intake valve and the exhaust valve in stroke 5 and then eliminating the restoring effect of the vacuum or the reduced pressure in the cylinder in stroke 6 by opening the intake valve and/or the exhaust valve in stroke 6.

Depending on the type of fuel injection in the spark-ignition engine, control device 27 controls the injection for the next working cycle, i.e., for stroke 1, which follows stroke 6.

For a spark-ignition engine having intake manifold injection, the injection duration is restricted because the injection may not take place until stroke 6; otherwise, unburned fuel could enter the exhaust duct.

In the case of an 8-cylinder internal combustion engine, ignition times may be achieved at equal intervals by having ignition only every 81 crankshaft degrees. Then with each cylinder, four strokes are available for supplying secondary air. The fuel supply is deactivated during these four strokes. Depending on the secondary air required, one or two cylinder fillings of fresh air may be discharged into the exhaust duct.

What is claimed is:

1. A method of operating an internal combustion engine including a plurality of cylinders, each cylinder including at least one intake valve and at least one exhaust valve having fully variable valve control, comprising:
   deactivating a fuel supply to at least one first cylinder including a piston which is displaceable in the at least one first cylinder;
   intaking a first quantity of fresh air into a combustion chamber of the at least one first cylinder by opening the at least one intake valve of the at least one first cylinder in a first downward movement of the piston of the at least one first cylinder in which the fuel supply is deactivated;
   ejecting a second quantity of fresh air out of the combustion chamber of the at least one first cylinder by opening the at least one exhaust valve of the at least one first cylinder in a first upward movement of the piston of the at least one first cylinder; and
   triggering the at least one intake valve and the at least one exhaust valve of the plurality of cylinders to operate the internal combustion engine in a multi-stroke operation having more than four strokes;
   wherein, for at least a fifth stroke and a sixth stroke of the multi-stroke operation, the at least one intake valve and the at least one exhaust valve are variably controlled as a function of operating variables of the internal combustion engine, wherein the at least one intake valve in an opened position connects the combustion chamber of the at least one first cylinder to an intake duct, and wherein the at least one intake valve in a closed position separates the combustion chamber of the at least one first cylinder from the intake duct, and wherein the at least one exhaust valve in an opened position connects the combustion chamber of the at least one first cylinder to an exhaust duct, and wherein the at least one exhaust valve in a closed position separates the combustion chamber of the at least one first cylinder from the exhaust duct, and wherein the first quantity of fresh air is taken in from the intake duct of the internal combustion engine.

2. The method of claim 1, wherein the first downward movement and the first upward movement directly follow an exhaust stroke of the at least one first cylinder of the plurality of cylinders.

3. The method of claim 2, wherein in at least one second downward movement and one second upward movement after the exhaust stroke of the at least one first cylinder of the plurality of cylinders, the at least one intake valve and the at least one exhaust valve of the at least one first cylinder are closed.

4. The method of claim 1, wherein the first quantity of fresh air is controlled by controlling at least one of a plurality of valve opening parameters of the at least one intake valve of the at least one first cylinder at the first downward movement of the piston, and a portion of the first quantity of fresh air intake which is ejected as the second quantity of fresh air is controlled by controlling at least one of a plurality of valve opening parameters of the at least one exhaust valve of the at least one first cylinder in the first downward movement of the cylinder.

5. The method of claim 4, wherein the plurality of valve opening parameters of the at least one intake valve and the plurality of valve opening parameters of the at least one exhaust valve of the at least one first cylinder include a valve opening time, a valve closing time, a valve lift, a valve opening speed, and a valve closing speed.

6. The method of claim 1, wherein the at least one intake valve and the at least one exhaust valve are triggered to operate the internal combustion engine in a six-stroke operation, and wherein for at least a fifth stroke and a sixth stroke of the six-stroke operation, the at least one intake valve and the at least one exhaust valve are controlled as a function of operating variables of the internal combustion engine.

7. A method of operating an internal combustion engine including a plurality of cylinders, each cylinder including at least one intake valve and at least one exhaust valve having fully variable valve control, comprising:
deactivating a fuel supply to at least one first cylinder including a piston which is displaceable in the at least one first cylinder;
intaking a first quantity of fresh air into a combustion chamber of the at least one first cylinder by opening the at least one intake valve of the at least one first cylinder in a first downward movement of the piston of the at least one first cylinder in which the fuel supply is deactivated;
ejecting a second quantity of fresh air out of the combustion chamber of the at least one first cylinder by opening the at least one exhaust valve of the at least one first cylinder in a first upward movement of the piston of the at least one first cylinder; and
triggering the at least one intake valve and the at least one exhaust valve of the plurality of cylinders to operate the internal combustion engine in a multi-stroke operation having more than four strokes;
wherein the first quantity of fresh air is controlled by controlling at least one of a plurality of valve opening parameters of the at least one intake valve of the at least one first cylinder at the first downward movement of the piston, and a portion of the first quantity of fresh air intake which is ejected as the second quantity of fresh air is controlled by controlling at least one of a plurality of valve opening parameters of the at least one exhaust valve of the at least one first cylinder in the first downward movement of the cylinder;
wherein the second quantity of fresh air is regulated by controlling at least one of the plurality of valve opening parameters of the at least one intake valve and at least one of the plurality of valve opening parameters of the at least one exhaust valve of the at least one first cylinder on a basis of an output signal of a lambda probe.

8. A control device, comprising:
an arrangement configured to operate an internal combustion engine including a plurality of cylinders, each cylinder including at least one intake valve and at least one exhaust valve having fully variable valve control, including:
deactivating a fuel supply to at least one first cylinder including a piston which is displaceable in the at least one first cylinder;
intaking a first quantity of fresh air into a combustion chamber of the at least one first cylinder by opening the at least one intake valve of the at least one first cylinder in a first downward movement of the piston of the at least one first cylinder in which the fuel supply is deactivated;
ejecting a second quantity of fresh air out of the combustion chamber of the at least one first cylinder by opening the at least one exhaust valve of the at least one first cylinder in a first upward movement of the piston of the at least one first cylinder; and
triggering the at least one intake valve and the at least one exhaust valve of the plurality of cylinders to operate the internal combustion engine in a multi-stroke operation having more than four strokes;
wherein, for at least a fifth stroke and a sixth stroke of the multi-stroke operation, the at least one intake valve and the at least one exhaust valve are variably controlled as a function of operating variables of the internal combustion engine, and wherein the at least one intake valve in an opened position connects the combustion chamber of the at least one first cylinder to an intake duct, and wherein the at least one intake valve in a closed position separates the combustion chamber of the at least one first cylinder from the intake duct, and wherein the at least one exhaust valve in an opened position connects the combustion chamber of the at least one first cylinder to an exhaust duct, and wherein the at least one exhaust valve in a closed position separates the combustion chamber of the at least one first cylinder from the exhaust duct, and wherein the first quantity of fresh air is taken in from the intake duct of the internal combustion engine.

9. A control device for operating an internal combustion engine including a plurality of cylinders, each cylinder including at least one intake valve and at least one exhaust valve having fully variable valve control, comprising:
means for deactivating a fuel supply to at least one first cylinder including a piston which is displaceable in the at least one first cylinder;
means for intaking a first quantity of fresh air into a combustion chamber of the at least one first cylinder by opening the at least one intake valve of the at least one first cylinder in a first downward movement of the piston of the at least one first cylinder in which the fuel supply is deactivated;
means for ejecting a second quantity of fresh air out of the combustion chamber of the at least one first cylinder by opening the at least one exhaust valve of the at least one first cylinder in a first upward movement of the piston of the at least one first cylinder; and
means for triggering the at least one intake valve and the at least one exhaust valve of the plurality of cylinders to operate the internal combustion engine in a multi-stroke operation having more than four strokes;
wherein, for at least a fifth stroke and a sixth stroke of the multi-stroke operation, the at least one intake valve and the at least one exhaust valve are variably controlled as a function of operating variables of the internal combustion engine, and wherein the at least one intake valve in an opened position connects the combustion chamber of the at least one first cylinder to an intake duct, and wherein the at least one intake valve in a closed position separates the combustion chamber of the at least one first cylinder from the intake duct, and wherein the at least one exhaust valve in an opened position connects the combustion chamber of the at least one first cylinder to an exhaust duct, and wherein the at least one exhaust valve in a closed position separates the combustion chamber of the at least one first cylinder from the exhaust duct, and wherein the first quantity of fresh air is taken in from the intake duct of the internal combustion engine.

10. A control device for operating an internal combustion engine including a plurality of cylinders, each cylinder including at least one intake valve and at least one exhaust valve having fully variable valve control, comprising:

an arrangement configured to deactivate a fuel supply to at least one first cylinder including a piston which is displaceable in the at least one first cylinder;

an arrangement configured to intake a first quantity of fresh air into a combustion chamber of the at least one first cylinder by opening the at least one intake valve of the at least one first cylinder in a first downward movement of the piston of the at least one first cylinder in which the fuel supply is deactivated;

an arrangement configured to eject a second quantity of fresh air out of the combustion chamber of the at least one first cylinder by opening the at least one exhaust valve of the at least one first cylinder in a first upward movement of the piston of the at least one first cylinder; and an arrangement configured to trigger the at least one intake valve and the at least one exhaust valve of the plurality of cylinders to operate the internal combustion engine in a multi-stroke operation having more than four strokes;

wherein, for at least a fifth stroke and a sixth stroke of the multi-stroke operation, the at least one intake valve and the at least one exhaust valve are variably controlled as a function of operating variables of the internal combustion engine, and wherein the at least one intake valve in an opened position connects the combustion chamber of the at least one first cylinder to an intake duct, and wherein the at least one intake valve in a closed position separates the combustion chamber of the at least one first cylinder from the intake duct, and wherein the at least one exhaust valve in an opened position connects the combustion chamber of the at least one first cylinder to an exhaust duct, and wherein the at least one exhaust valve in a closed position separates the combustion chamber of the at least one first cylinder from the exhaust duct, and wherein the first quantity of fresh air is taken in from the intake duct of the internal combustion engine.

11. The control device of claim 10, wherein the at least one intake valve and the at least one exhaust valve are triggered to operate the internal combustion engine in a six-stroke operation, and wherein for at least a fifth stroke and a sixth stroke of the six-stroke operation, the at least one intake valve and the at least one exhaust valve are controlled as a function of operating variables of the internal combustion engine.

* * * * *